United States Patent
Hikata et al.

(10) Patent No.: US 11,685,655 B2
(45) Date of Patent: Jun. 27, 2023

(54) CARBON NANOSTRUCTURE PRODUCING METHOD, CARBON NANOSTRUCTURE AND CARBON NANOSTRUCTURE PRODUCING APPARATUS

(71) Applicants: SUMITOMO ELECTRIC INDUSTRIES, LTD., Osaka (JP); UNIVERSITY OF TSUKUBA, Tsukuba (JP)

(72) Inventors: Takeshi Hikata, Osaka (JP); Soichiro Okubo, Osaka (JP); Ryusuke Nakai, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 435 days.

(21) Appl. No.: 16/763,343

(22) PCT Filed: Jun. 29, 2018

(86) PCT No.: PCT/JP2018/024809
§ 371 (c)(1),
(2) Date: May 12, 2020

(87) PCT Pub. No.: WO2019/097756
PCT Pub. Date: May 23, 2019

(65) Prior Publication Data
US 2020/0290877 A1    Sep. 17, 2020

(30) Foreign Application Priority Data
Nov. 15, 2017 (JP) .................. 2017-220387

(51) Int. Cl.
| | |
|---|---|
| *C01B 32/18* | (2017.01) |
| *C01B 32/162* | (2017.01) |
| *B82Y 40/00* | (2011.01) |
| *B82Y 30/00* | (2011.01) |

(52) U.S. Cl.
CPC ............ *C01B 32/18* (2017.08); *C01B 32/162* (2017.08); *B82Y 30/00* (2013.01); *B82Y 40/00* (2013.01); *C01P 2004/03* (2013.01)

(58) Field of Classification Search
CPC ....... C01B 32/162; C01B 32/18; C01B 32/15; C01B 32/16; B82Y 40/00
See application file for complete search history.

(56) References Cited

U.S. PATENT DOCUMENTS

2006/0067871 A1* 3/2006 Hart ................. C01B 32/18
                                                      423/447.3
2007/0224107 A1    9/2007 Hikata
(Continued)

FOREIGN PATENT DOCUMENTS

CN    103387218 A  * 11/2013  ............ B01J 15/005
JP    2002-542136 A    12/2002
(Continued)

OTHER PUBLICATIONS

Lu et al., Formation of Bamboo-shape Carbon Nanotubes by Controlled Rapid Decomposition of Picric Acid, Carbon, vol. 42, No. 15, Sep. 18, 2004, pp. 3199-3207.
(Continued)

*Primary Examiner* — Brian R Ohara
*Assistant Examiner* — Brent C Thomas
(74) *Attorney, Agent, or Firm* — Oliff PLC

(57) ABSTRACT

A carbon nanostructure producing method includes a growth step in which a plurality of catalyst particles in close contact with each other are separated in a flow of a carbon-containing gas so as to grow carbon nanotubes between the plurality
(Continued)

of catalyst particles, and an elongation step in which the carbon nanotube is elongated by a wind pressure of the carbon-containing gas with at least one of the catalyst particles being retained.

6 Claims, 6 Drawing Sheets

(56) References Cited

U.S. PATENT DOCUMENTS

| 2011/0085961 A1* | 4/2011 | Noda | B01J 8/0055 |
| | | | 422/198 |
| 2022/0064003 A1* | 3/2022 | Fujimori | B01J 8/06 |

FOREIGN PATENT DOCUMENTS

| JP | 2003-183939 A | 7/2003 |
| JP | 2005-330175 A | 12/2005 |
| JP | 2012-56808 A | 3/2012 |
| JP | 2014-058432 A | 4/2014 |
| WO | 2000/063115 A1 | 10/2000 |
| WO | 2016/017827 A1 | 2/2016 |

OTHER PUBLICATIONS

Oct. 2, 2018 International Search Report issued in International Patent Application No. PCT/JP2018/024809.

* cited by examiner

CARBON NANOSTRUCTURE PRODUCING METHOD, CARBON NANOSTRUCTURE AND CARBON NANOSTRUCTURE PRODUCING APPARATUS

TECHNICAL FIELD

The present disclosure relates to a carbon nanostructure producing method, a carbon nanostructure, and a carbon nanostructure producing apparatus. The present application claims the benefit of priority to Japanese Patent Application No. 2017-220387 filed on Nov. 15, 2017, the entire contents of which are incorporated herein by reference.

BACKGROUND ART

Carbon nanostructures such as linear carbon nanotubes and sheet-shaped graphene in which carbon atoms are arranged in line at nanometer-level intervals are known. Such carbon nanostructures may be obtained by a vapor phase growth method in which a raw material gas containing carbon is supplied to fine particles of a catalyst such as iron under heating so as to grow carbon nanostructures from the catalyst (for example, see Japanese Patent Laying-Open No. 2005-330175).

CITATION LIST

Patent Literature

PTL 1: Japanese Patent Laying-Open No. 2005-330175

SUMMARY OF INVENTION

A carbon nanostructure producing method according to an aspect of the present disclosure includes a growth step in which a plurality of catalyst particles in close contact with each other are separated in a flow of a carbon-containing gas so as to grow carbon nanotubes between the plurality of catalyst particles, and an elongation step in which the carbon nanotube is elongated by a wind pressure of the carbon-containing gas with at least one of the catalyst particles being retained.

Further, a carbon nanostructure according to another aspect of the present disclosure includes a tube portion which is formed from graphene into a tubular shape, and a cone portion which is formed from graphene into a conical shape and expands continuously in diameter from an end of the tube portion.

Furthermore, a carbon nanostructure producing apparatus according to still another aspect of the present disclosure includes a tubular reaction chamber to be heated, a gas supplying mechanism configured to supply a carbon-containing gas from one end of the reaction chamber into the reaction chamber, a catalyst supplying mechanism configured to release a plurality of catalyst particles in aggregated state into the carbon-containing gas flowing through the reaction chamber, and a substrate retaining mechanism disposed in the reaction chamber and configured to retain a substrate that captures the catalyst particles. The average flow rate of the carbon-containing gas flowing through the reaction chamber is 0.05 cm/sec or more, and the Reynolds number thereof is 1000 or less.

DETAILED DESCRIPTION

Figure 1:
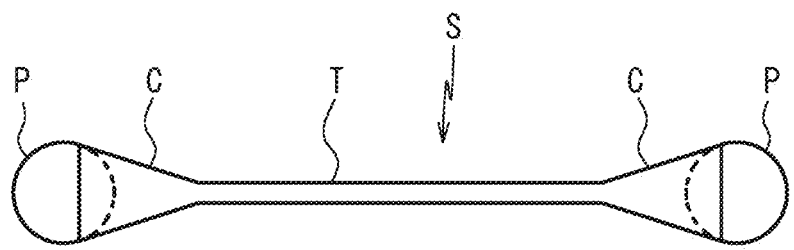
FIG. 1 is a schematic diagram illustrating a carbon nanostructure according to an embodiment of the present disclosure.

Problem to be Solved by the Present Disclosure

In the conventional vapor phase growth method disclosed by the above publication, since the growth rate is low, the production efficiency is not sufficient. Further, in the conventional vapor phase growth method, since the growth of carbon nanotubes is unstable, the obtained carbon nanotubes are relatively short.

The present disclosure has been made in view of the problems mentioned above, and an object thereof is to provide a carbon nanostructure producing method, a carbon nanostructure, and a carbon nanostructure producing apparatus, which makes it possible to efficiently produce a long carbon nanostructure.

[Advantageous Effect of the Present Disclosure]

According to the carbon nanostructure producing method, the carbon nanostructure, and the carbon nanostructure producing apparatus according to one embodiment of the present disclosure, a long carbon nanostructure may be produced efficiently.

DESCRIPTION OF EMBODIMENTS

A carbon nanostructure producing method according to an aspect of the present disclosure includes a growth step in which a plurality of catalyst particles in close contact with each other are separated in a flow of a carbon-containing gas so as to grow carbon nanotubes between the plurality of catalyst particles, and an elongation step in which the carbon nanotube is elongated by a wind pressure of the carbon-containing gas with at least one of the catalyst particles being retained.

According to the carbon nanostructure producing method, in the growth step, carbon nanotubes are formed between the catalyst particles by the vapor phase growth method, and in the elongation step, the formed carbon nanotubes are plastically elongated by the wind pressure of the carbon-containing gas with the catalyst particles being retained as the growth points of the carbon nanotubes so as to form a carbon nanostructure which includes a tube portion that is smaller in diameter but longer in length and a cone portion that has a conical shape after the elongation. Therefore, the carbon nanostructure producing method can form a carbon nanostructure that is longer in length at a speed higher than the growth speed of the carbon nanotubes. Therefore, according to the carbon nanostructure producing method, the carbon nanostructure may be formed longer before the catalytic reaction becomes unstable, which makes it possible to produce a long carbon nanostructure efficiently.

According to the carbon nanostructure producing method, a disintegrable catalyst, which disintegrates and releases the plurality of catalyst particles when subjected to the wind pressure of the carbon-containing gas, may be disposed in the flow of the carbon-containing gas in the growth step, and the catalyst particles may be captured by a substrate arranged along the flow of the carbon-containing gas in the elongation step. Since the disintegrable catalyst is disposed in the flow of the carbon-containing gas in the growth step, the plurality of catalyst particles in aggregated state may be easily separated. Since the substrate is arranged to capture the catalyst particles in the elongation step as described above, the catalyst particles may be captured without obstructing the flow of the carbon-containing gas, which makes it possible to elongate the carbon nanotube efficiently by using the wind pressure of the carbon-containing gas.

In the carbon nanostructure producing method, the disintegrable catalyst may be metal foil. Since the disintegrable catalyst is metal foil, it may disintegrate into fine catalyst particles when subjected to the wind pressure of the carbon-containing gas, which makes it possible to produce the carbon nanostructure efficiently.

In the carbon nanostructure producing method, the flow rate of the carbon-containing gas may be repeatedly changed in the growth step. By repeatedly changing the flow rate of the carbon-containing gas in the growth step, it is possible to reliably disintegrate the disintegrable catalyst, which makes it possible to produce the carbon nanostructure efficiently.

In the carbon nanostructure producing method, the average diameter of the catalyst particles may be 30 nm or more and 1000 μm or less. By setting the average diameter of the catalyst particles within the range mentioned above, it is possible to grow carbon nanotubes that may be elongated thereafter, which makes it possible to improve the production efficiency of the carbon nanostructure.

A carbon nanostructure according to another aspect of the present disclosure includes a tube portion which is formed from graphene into a tubular shape, and a cone portion which is formed from graphene into a conical shape and expands continuously in diameter from an end of the tube portion.

The carbon nanostructure may be formed by growing a carbon nanotube having a diameter approximately equal to a larger diameter of the cone portion, and sequentially elongating the carbon nanotube from the growth point toward the far side in the longitudinal direction so as to reduce the diameter. In other words, the carbon nanostructure may be formed at a speed higher than the growth speed of the carbon nanotube, and thereby, the length thereof may be relatively easily increased.

Furthermore, a carbon nanostructure producing apparatus according to still another aspect of the present disclosure includes a tubular reaction chamber to be heated, a gas supplying mechanism configured to supply a carbon-containing gas from one end of the reaction chamber into the reaction chamber, a catalyst supplying mechanism configured to release a plurality of catalyst particles in aggregated state into the carbon-containing gas flowing through the reaction chamber, and a substrate retaining mechanism disposed in the reaction chamber and configured to retain a substrate that captures the catalyst particles, the average flow rate of the carbon-containing gas flowing through the reaction chamber is 0.05 cm/sec or more, and the Reynolds number thereof is 1000 or less.

According to the carbon nanostructure producing apparatus, the gas supplying mechanism is used to form a flow of carbon-containing gas in the reaction chamber, and the catalyst supplying mechanism is used to release a plurality of catalyst particles in aggregated state into the flow of carbon-containing gas. When the plurality of catalyst particles are separated, carbon nanotubes are formed between the catalyst particles, the catalyst particles with a carbon nanotube growing therebetween are captured by the substrate retained by the substrate retaining mechanism, and the carbon nanotube is elongated by the wind pressure of the carbon-containing gas, which makes it possible to form a carbon nanostructure which includes a tube portion that is smaller in diameter but longer in length and a cone portion that has a conical shape after the elongation.

In the present disclosure, the term of "average diameter" refers to the average value of diameters of particles in the microscope image.

Details of Embodiments

Hereinafter, embodiments of the present disclosure will be described in detail with reference to the drawings.

[Carbon Nanostructure]

FIG. 1 illustrates a carbon nanostructure S according to an embodiment of the present disclosure. The carbon nanostructure S includes a tube portion T which is formed from graphene into a tubular shape, and a cone portion C which is formed from graphene into a conical shape and expands continuously in diameter from an end of the tube portion T.

The carbon nanostructure S is formed in such a manner that both ends of the tube portion T are formed with the cone portion C and a catalyst particle P is adhered to the larger-diameter side of each cone portion C. In addition, the carbon nanostructure S may be joined to another carbon nanostructure S from the other side of the catalyst particle P located at one end.

The carbon nanostructure S may contain no catalyst particle P, and the carbon nanostructure S may be broken at a point within the tube portion T and thus have only one cone portion C at one end of the tube portion T.

The carbon nanostructure S may be formed from single-layered graphene or from multilayered graphene. In other words, the tube portion T and the cone portion C each may have a plurality of layers.

In the carbon nanostructure S, the lower limit of the average outer diameter of the tube portion T is preferably 0.4 nm, and more preferably 1.0 nm. On the other hand, the upper limit of the average outer diameter of the tube portion T is preferably 50 nm, and more preferably 10 nm. If the average outer diameter of the tube portion T is less than the lower limit, it may be difficult to produce the carbon nanostructure. On the contrary, if the average outer diameter of the tube portion T is greater than the upper limit, it may be difficult to increase the length of the tube portion T.

In the carbon nanostructure S, the average outer diameter of an end part of the cone portion C opposite to the tube portion T is equal to the outer diameter of a carbon nanotube that grows from the catalyst particle P according to the vapor phase growth method. The lower limit of the average outer diameter of the end part of the cone portion C opposite to the tube portion T is preferably 20 nm, and more preferably 30 nm. On the other hand, the upper limit of the average outer diameter of the end part of the cone portion C opposite to the tube portion T is preferably 500 nm, and more preferably 300 nm. If the average outer diameter of the end part of the cone portion C opposite to the tube portion T is less than the lower limit, the difference relative to the outer diameter of the tube portion T is small, which makes it difficult to increase the length of the tube portion T. On the contrary, if the average outer diameter of the end part of the cone portion C opposite to the tube portion T is greater than the upper limit, the rigidity of the carbon nanotube that grows from the catalyst particle P becomes greater, which makes it difficult to form the tube portion T or to increase the length of the tube portion T.

[Carbon Nanostructure Producing Apparatus]

Figure 2:
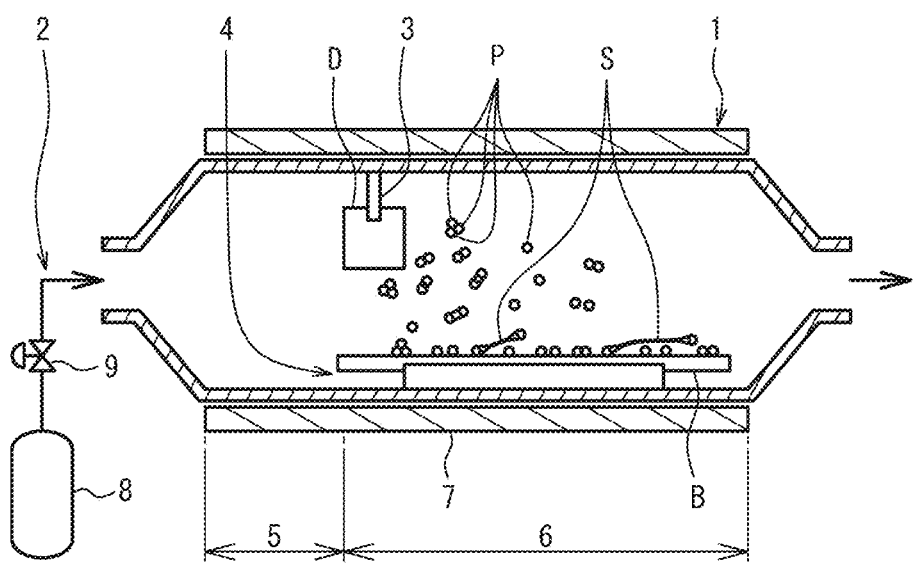
FIG. 2 is a schematic diagram illustrating a carbon nanostructure producing apparatus according to an embodiment of the present disclosure.

The carbon nanostructure S in FIG. 1 may be produced by the carbon nanostructure producing apparatus illustrated in FIG. 2. The carbon nanostructure producing apparatus in FIG. 2 itself is an embodiment of the present disclosure.

The carbon nanostructure producing apparatus includes a tubular reaction chamber 1, a gas supplying mechanism 2 configured to supply a carbon-containing gas into the reaction chamber 1 from one end of the reaction chamber 1, a catalyst supplying mechanism 3 configured to release a plurality of catalyst particles P in aggregated state into the carbon-containing gas flowing through the reaction chamber 1, and a substrate retaining mechanism 4 disposed in the reaction chamber 1 and configured to retain a substrate B that captures the catalyst particles P.

<Reaction Chamber>

In the reaction chamber 1, the flow of the carbon-containing gas is laminated into a laminar flow in an entrance zone 5 upstream of the catalyst supplying mechanism 3, and the laminar flow of the carbon-containing gas is used to form carbon nanostructures in a formation zone 6 downstream of the catalyst supplying mechanism 3.

The reaction chamber 1 is further provided with a heater 7. In other words, the reaction chamber 1 is heated by the heater 7.

The internal temperature in the formation zone 6 of the reaction chamber 1 is preferably 800° C. or more and 1200° C. or less. In order to maintain such a temperature, the carbon-containing gas from the gas supplying mechanism 2 may be heated and then supplied to the reaction chamber 1, or the carbon-containing gas may be heated in the entrance zone 5.

<Gas Supplying Mechanism>

The gas supplying mechanism 2 may be configured to include a gas tank 8 and a flow control valve 9 so as to supply a carbon-containing gas to the reaction chamber 1.

The carbon-containing gas supplied from the gas supplying mechanism 2 is a reductive gas such as hydrocarbon gas. As the carbon-containing gas, for example, a mixed gas of acetylene and nitrogen or argon, methane or the like may be used.

The lower limit of the average flow rate of the carbon-containing gas supplied from the gas supplying mechanism 2 into the reaction chamber 1 is 0.05 cm/sec, preferably 0.10 cm/sec, and more preferably 0.20 cm/sec. On the other hand, the upper limit of the average flow rate in the reaction chamber 1 is preferably 10.0 cm/sec, and more preferably 0.5 cm/sec. If the average flow rate of the carbon-containing gas in the reaction chamber 1 is less than the lower limit, the wind pressure may be insufficient to elongate the carbon nanotubes formed between the catalyst particles P. On the contrary, if the average flow rate of the carbon-containing gas in the reaction chamber 1 is greater than the upper limit, the carbon nanotubes may be detached from the catalyst particles P, which may stop the growth of the carbon nanotubes, and consequently retard the formation of the carbon nanostructure.

The lower limit of the Reynolds number of the flow of the carbon-containing gas supplied from the gas supplying mechanism 2 into the reaction chamber 1 is preferably 0.01, and more preferably 0.05. On the other hand, the upper limit of the Reynolds number is 1000, preferably 100, and more preferably 10. If the Reynolds number is less than the lower limit, the design of the carbon nanostructure producing apparatus may encounter excessive restrictions, which may make the carbon nanostructure producing apparatus unnecessarily expensive and may make the production efficiency of the carbon nanostructure unnecessarily low. If the Reynolds number is greater than the upper limit, the flow of the carbon-containing gas may encounter disturbance, which may retard the formation of carbon nanotubes between the catalyst particles and the elongation of the carbon nanotubes.

It is preferable that the gas supplying mechanism 2 repeatedly changes the supply amount of the carbon-containing gas to the reaction chamber 1. Thereby, the flow rate of the carbon-containing gas in the reaction chamber 1 increases or decreases repeatedly, which promotes the separation of the plurality of aggregated catalyst particles P, whereby increases the number of carbon nanostructures to be obtained.

<Catalyst Supplying Mechanism>

The catalyst supplying mechanism 3 may be configured to hold, in the flow of the carbon-containing gas, the disintegrable catalyst D which disintegrates and releases a plurality of catalyst particles P when subjected to the wind pressure of the carbon-containing gas. The catalyst supplying mechanism 3 may be configured to hold a long-sized disintegrable catalyst D having, for example, a band shape or a rod shape, and gradually feed the same into the reaction chamber 1. As described above, by using the disintegrable catalyst D, it is possible to release a plurality of catalyst particles P in aggregated state at a high temperature into the flow of the carbon-containing gas, which makes it possible to reliably grow carbon nanotubes between the plurality of catalyst particles.

Preferably, the disintegrable catalyst D is metal foil which is easy to release fine catalyst particles P. Example materials for forming the disintegrable catalyst D may include iron, nickel and the like, and among them, high-purity iron excellent in disintegration and catalysis is particularly preferable. When the high-purity iron is heated to a high temperature in the reaction chamber 1 and then exposed to a carbon-containing gas, iron carbide ($Fe_3C$) is formed on the surface due to carburization, which makes it possible to easily disintegrate from the surface so as to release the catalyst particles P sequentially. In this case, the main ingredient in the released catalyst particles P is iron carbide ($Fe_3C$) or iron oxide ($Fe_2O_3$).

The lower limit of the average diameter of the catalyst particles P to be captured by the substrate B is preferably 30 nm, more preferably 40 nm, and further preferably 50 nm. On the other hand, the upper limit of the average diameter of the catalyst particles P to be captured by the substrate B is preferably 1000 µm more preferably 100 µm and further preferably 10 µm. If the average diameter of the catalyst particles P to be captured by the substrate B is less than the lower limit, the diameter of carbon nanofibers formed from the catalyst particles P is small, and thereby the elongation ratio is small, which may be impossible to sufficiently elongate the tube portion T of the carbon nanostructure S. On the contrary, if the average diameter of the catalyst particles P to be captured by the substrate B is greater than the upper limit, it may be difficult to elongate the carbon nanofibers formed from the catalyst particles P.

The lower limit of the average thickness of the metal foil used as the disintegrable catalyst D is preferably 1 µm and more preferably 20 μm. On the other hand, the upper limit of the average thickness of the metal foil used as the disintegrable catalyst D is preferably 500 μm and more preferably 200 μm. If the average thickness of the metal foil used as the disintegrable catalyst D is less than the lower limit, the metal foil may be blown to break by the carbon-containing gas. On the contrary, if the average thickness of the metal foil used as the disintegrable catalyst D is greater than the upper limit, the disintegration rate may be slow, which may lower the formation efficiency of the carbon nanostructures.

<Substrate Retaining Mechanism>

The substrate retaining mechanism 4 retains the substrate B at a position below the catalyst supplying mechanism 3 which supplies the catalyst particles so that the substrate B extends downstream along the flow direction of the carbon-containing gas. The substrate B is preferably retained to extend widely in a range where the catalyst particles may fall in consideration of the falling speed of the catalyst particles P in the flow of the carbon-containing gas.

The substrate retaining mechanism 4 uses the substrate B to capture the catalyst particles P released from the catalyst supplying mechanism 3 and retains the same at the captured position against the flow of the carbon-containing gas. Accordingly, due to the wind pressure of the carbon-containing gas applied to the carbon nanotube that extends from a catalyst particle P which is being retained on the substrate B and to another catalyst particle P at the other end of the carbon nanotube, the carbon nanotube that extends from the catalyst particle P which is being retained on the substrate B is pulled to undergo plastic deformation, and consequently, the carbon nanotube is elongated in the longitudinal direction with the diameter thereof being reduced at the same time.

Even during the period in which the carbon nanotube is elongated, the carbon nanotube may continue to grow from the catalyst particle P at the original diameter. Thus, the carbon nanostructure S formed by the carbon nanostructure producing apparatus includes a tube portion T which has a tubular shape and a cone portion C which has a conical shape and expands continuously in diameter from the end of the tube portion.

In other words, the carbon nanostructure producing apparatus grows a carbon nanotube according to the vapor phase growth method and elongates the same by the wind pressure of the carbon-containing gas at the same time, and thereby converts some hexagonal cells of the carbon nanotube into pentagonal cells so as to form the conical cone portion C, and restores the pentagonal cells into the hexagonal cells so as to form the tube portion T which is a carbon nanotube with a smaller diameter.

As described above, the carbon nanostructure producing apparatus elongates a carbon nanotube that grows from the catalyst particles P, and thereby forms the tube portion T at an extremely large speed as compared with the growth speed of the carbon nanotube that grows from the catalyst particle P, which makes it possible to from a long carbon nanostructure S in a relatively short time. Thus, a sufficiently long carbon nanostructure S may be formed even if the time for keeping the carbon nanotube to continuously grow from the catalyst particles P is short.

In addition, it is considered that the carbon nanostructure producing apparatus promotes the incorporation of carbon atoms at the growth point of the carbon nanotube by applying a tension force, i.e., the wind pressure of the carbon-containing gas to the carbon nanotube that grows from the catalyst particle P. Accordingly, it is considered that the carbon nanostructure producing apparatus may further increase the growth rate of the carbon nanotube, and consequently increase the length of the obtained carbon nanostructure S.

As the substrate B, for example, a heat-resistant glass substrate such as a silicon substrate or a piece of quartz glass, a ceramic substrate such as alumina or the like may be used. The substrate retaining mechanism 4 may be configured to move the long-sized substrate B or a plurality of substrates B along the flow direction of the carbon-containing gas. As described above, the carbon nanostructure producing apparatus prevents the surface of the substrate B from being filled up with the catalyst particles P by moving the substrate B, which makes it possible to continuously produce the carbon nanostructure S.

[Carbon Nanostructure Producing Method]

The carbon nanostructure S may be produced by the carbon nanostructure producing method according to a further embodiment of the present disclosure. The carbon nanostructure producing method may be performed using the carbon nanostructure producing apparatus in FIG. 2, but is not limited to the method using the carbon nanostructure producing apparatus in FIG. 2.

Figure 3:
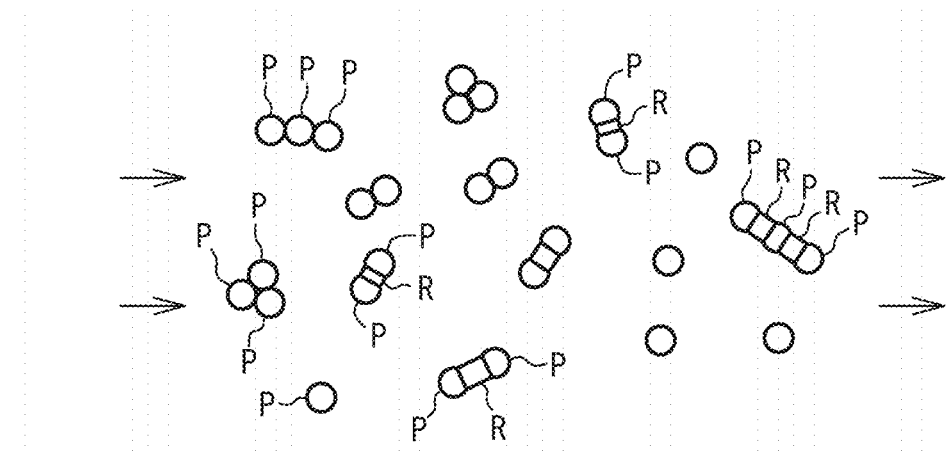
FIG. 3 is a schematic diagram illustrating a growth step in a carbon nanostructure producing method according to an embodiment of the present disclosure.

The carbon nanostructure producing method includes a growth step (see FIG. 3) in which a plurality of catalyst particles P in close contact with each other are separated in a flow of a carbon-containing gas so as to grow carbon nanotubes R between the plurality of catalyst particles P, and an elongation step (see FIG. 4) in which the carbon nanotube R is elongated by a wind pressure of the carbon-containing gas with at least one of the catalyst particles P being retained.

As described above with respect to the carbon nanostructure producing apparatus of FIG. 2, in the growth step, the disintegrable catalyst D, which disintegrates and releases the plurality of catalyst particles P when subjected to the wind pressure of the carbon-containing gas, may be arranged in the flow of the carbon-containing gas.

In the elongation step, the catalyst particles P may be captured and retained by the substrate B arranged along the flow of the carbon-containing gas.

Figure 4:
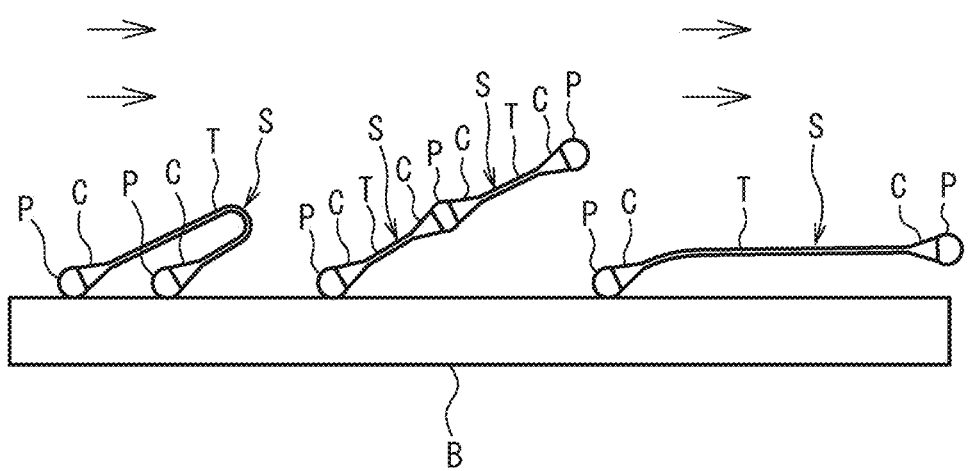
FIG. 4 is a schematic diagram illustrating an elongation step in the carbon nanostructure producing method according to an embodiment of the present disclosure.

In the elongation step, when the catalyst particle P at one end of the carbon nanotube R is retained (captured by the substrate B), the wind pressure of the carbon-containing gas may act on the catalyst particle P at the other end so as to elongate the carbon nanotube R efficiently as illustrated in FIG. 4. Furthermore, in the elongation step, when the catalyst particles P at both ends of the carbon nanotube R are retained, the wind pressure of the carbon-containing gas may act on the carbon nanotube R or the tube portion T that is elongated from the carbon nanotube R so as to elongate the carbon nanotube R. In this case, the tube portion of the carbon nanostructure S has a bent shape such as a U-shape.

The other conditions in the carbon nanostructure producing method may be the same as those described for the carbon nanostructure producing apparatus in FIG. 2.

Advantages

The carbon nanostructure producing method and the carbon nanostructure producing apparatus can use the wind pressure of a carbon-containing gas to elongate a carbon nanotube R which is formed by a vapor phase growth method between catalyst particles so as to produce a carbon nanostructure S including a tube portion T and a cone portion C.

Since the carbon nanostructure S produced by the carbon nanostructure producing method and the carbon nanostructure producing apparatus may be formed with a tube portion T by elongating the carbon nanotube R formed by the vapor phase growth method, it is possible to obtain a long carbon nanostructure S efficiently.

As described above, since the carbon nanostructure S may be produced efficiently and may be made to have a long size easily, it may be used for various purposes.

Since the carbon nanostructure S has the cone portion C which has a larger diameter at the end, it is relatively easy to fill another material into the tube portion T.

Other Embodiments

The embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

The catalyst supplying mechanism in the carbon nanostructure producing apparatus may be configured to supply a plurality of catalyst particles which are formed into the particle form preliminarily instead of a disintegrable catalyst. As a specific example, the catalyst supplying mechanism may be configured to expose a plurality of deposited catalyst particles into the flow of carbon-containing gas so that the catalyst particles in the surface layer are blown off sequentially.

EXAMPLES

Hereinafter, the present invention will be described in detail with reference to the examples, but the present invention is not limited to the examples.

Example 1

A quartz tube having an inner diameter of 20 mm was disposed in a heating furnace, and a substrate having a width of 10 mm and a disintegrable catalyst which is a square-shaped pure iron sheet (purity: 4N) having a thickness of 50 μm and a side length of 1 cm were placed in the quartz tube. Then, while 100% argon gas was being supplied to the quartz tube at a flow rate of 60 cc/min, the temperature of the heating furnace was raised to 1000° C., and thereafter, in addition to the argon gas, methane gas was supplied at a flow rate of 0 to 200 cc/min for 15 seconds to 1 hour while changing the flow rate every 5 seconds to 1 minute.

Figure 5:
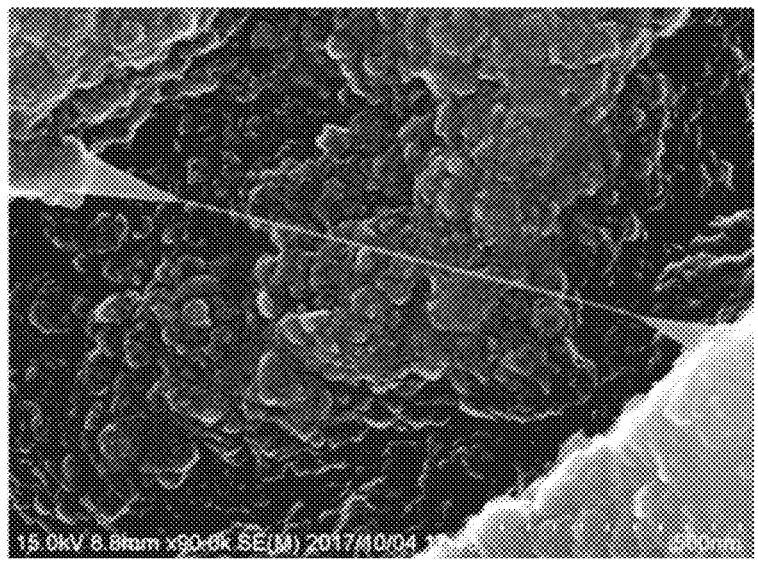
FIG. 5 is an electron micrograph illustrating a carbon nanostructure according to an example of the present disclosure.
Figure 6:
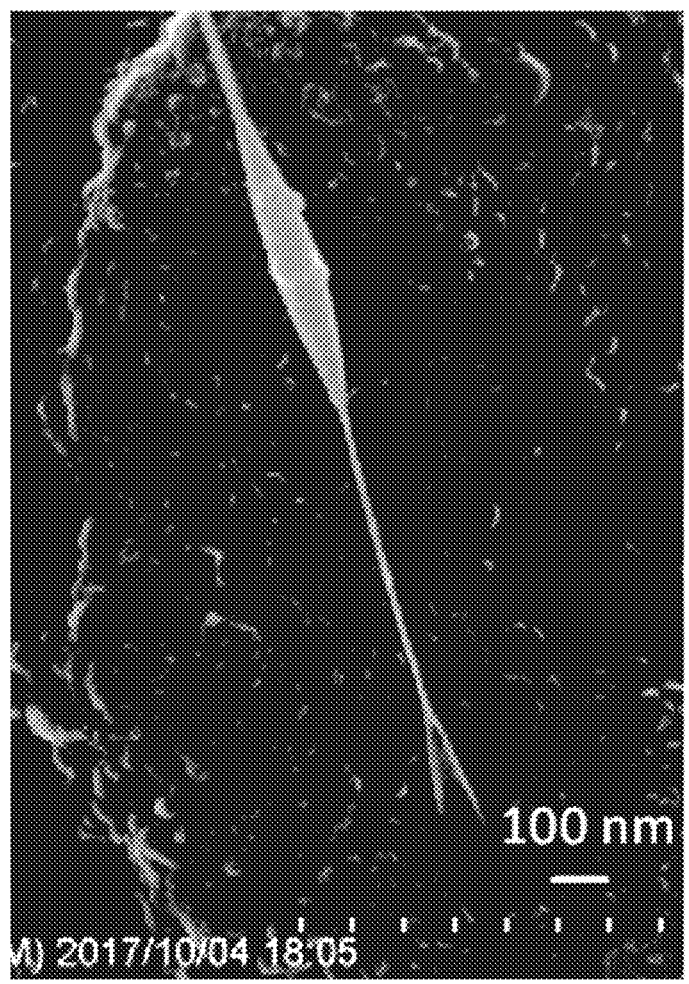
FIG. 6 is an electron micrograph illustrating a carbon nanostructure different from that of FIG. 5 according to another example of the present disclosure.

Due to the supply of the carbon-containing gas, the pure iron sheet disintegrates and releases catalyst particles having a particle size of 30 nm to 300 nm, and the catalyst particles were captured by the substrate. Between some of the catalyst particles adhered to the substrate, a carbon nanostructure having a tube portion and a pair of cone portions was formed so as to bridge between the particles (see FIGS. 5 and 6).

The obtained carbon nanostructure was observed with a scanning electron microscope and the diameter thereof was measured. The outer diameter of the tube portion was 3 nm to 30 nm, and the outer diameter of the end part of the cone portion was 30 nm to 300 nm. Further, most of the tube portions extend linearly, and the maximum length thereof was about 30 mm.

Furthermore, the structure of the obtained carbon nanostructure was analyzed by Raman spectroscopy and transmission electron microscope. It was confirmed that the carbon nanostructure was formed almost entirely from multilayered graphene, and in particular the peaks indicating lattice defects were extremely small in the Raman spectroscopy.

Example 2

Similar to Example 1, a quartz tube was disposed in a heating furnace, and a quartz substrate to which iron nanoparticles having an average diameter of 10 nm were attached as catalyst particles was placed in the quartz tube, and heated with the supply of argon gas first and then the carbon-containing gas under the same conditions as Example 1.

As a result, carbon nanotubes having an outer diameter of about 10 nm and a maximum length of 300 nm were formed on the substrate. The obtained carbon nanotubes were bent, and almost no linear carbon nanotube was found. Only one end of each obtained carbon nanotube was attached with a catalyst particle.

As described above, in Example 1, a plurality of catalyst particles in close contact with each other were separated in the flow of the carbon-containing gas, and the carbon nanotube formed between the particles was elongated, and thus, a long-sized and linearly extending carbon nanostructure was obtained.

INDUSTRIAL APPLICABILITY

The carbon nanostructure producing method and the carbon nanostructure producing apparatus according to the present disclosure may be used to replace a conventional carbon nanostructure producing method and a conventional carbon nanostructure producing apparatus. Further, the carbon nanostructure according to the present disclosure may be suitably used in applications where a long carbon nanotube is particularly required.

REFERENCE SIGNS LIST

1: reaction chamber; 2: gas supplying mechanism; 3: catalyst supplying mechanism; 4: substrate retaining mechanism; 5: entrance zone; 6: formation zone; 7: heater; 8: gas tank; 9: flow control valve; C: cone portion; D: disintegrable catalyst; P: catalyst particle; R: carbon nanotube; S: carbon nanostructure; T: tube portion

The invention claimed is:

1. A carbon nanostructure producing method comprising:
    a growth step in which a plurality of catalyst particles in close contact with each other are separated in a flow of a carbon-containing gas so as to grow carbon nanotubes between the plurality of catalyst particles; and
    an elongation step in which the carbon nanotube is elongated by a wind pressure of the carbon-containing gas with at least one of the catalyst particles being retained,
    wherein the carbon nanotubes are attached to more than one of the plurality of catalyst particles at the same time.

2. The carbon nanostructure producing method according to claim 1, wherein
    a disintegrable catalyst, which disintegrates and releases the plurality of catalyst particles when subjected to the wind pressure of the carbon-containing gas, is disposed in the flow of the carbon-containing gas in the growth step, and the catalyst particles are captured by a substrate arranged along the flow of the carbon-containing gas in the elongation step.

3. The carbon nanostructure producing method according to claim 2, wherein
the disintegrable catalyst is metal foil.

4. The carbon nanostructure producing method according to claim 2, wherein
the flow rate of the carbon-containing gas is repeatedly changed in the growth step.

5. The carbon nanostructure producing method according to claim 1, wherein
the average diameter of the catalyst particles is 30 nm or more and 1000 m or less.

6. The carbon nanostructure producing method according to claim 1, wherein
the carbon nanotubes at each end are attached to different catalyst particles.

* * * * *